US007321918B2

(12) United States Patent
Burd et al.

(10) Patent No.: US 7,321,918 B2
(45) Date of Patent: Jan. 22, 2008

(54) SERVER-SIDE CONTROL OBJECTS FOR PROCESSING CLIENT-SIDE USER INTERFACE ELEMENTS

(75) Inventors: Gary S. Burd, Kirkland, WA (US); Kenneth B. Cooper, Seattle, WA (US); Scott D. Guthrie, Redmond, WA (US); David S. Ebbo, Redmond, WA (US); Mark T. Anders, Bellevue, WA (US); Ted A. Peters, Seattle, WA (US); Stephen J. Millet, Edmonds, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/966,618

(22) Filed: Oct. 14, 2004

(65) Prior Publication Data
US 2005/0050164 A1  Mar. 3, 2005

Related U.S. Application Data

(63) Continuation of application No. 09/573,769, filed on May 18, 2000, now Pat. No. 6,961,750.

(51) Int. Cl.
G00F 15/16 (2006.01)
G06F 7/00 (2006.01)
G06F 15/00 (2006.01)

(52) U.S. Cl. ............... 709/203; 709/219; 715/513; 707/10

(58) Field of Classification Search ............ 709/203, 709/219; 715/513; 718/315; 717/100
See application file for complete search history.

(56) References Cited

U.S. PATENT DOCUMENTS

| 5,928,323 A | * | 7/1999 | Gosling et al. | ............ 709/203 |
| 5,940,075 A | | 8/1999 | Mutschler, III et al. | |
| 5,953,524 A | | 9/1999 | Meng et al. | |
| 5,991,802 A | | 11/1999 | Allard et al. | |
| 6,253,228 B1 | * | 6/2001 | Ferris et al. | ............ 709/203 |
| 6,370,561 B1 | * | 4/2002 | Allard et al. | ............ 709/203 |
| 6,651,108 B2 | * | 11/2003 | Popp et al. | ............ 719/315 |

FOREIGN PATENT DOCUMENTS

| WO | WO 98 21651 | 5/1998 |
| WO | WO 98 44695 A | 10/1998 |
| WO | WO 99 34288 A | 7/1999 |

OTHER PUBLICATIONS

"Server-Side JavaScript Features", 1998, Netscape Communication Corporation (no author).*
"Developing ASP-Based Applications" from Microsoft Corporation ©1996.
European Search Report for EP 01 11 1679, Dec. 2002.
Franklin, K., "Supercharge Data Binding", Visual Basic Programmer's Journal, Mar. 2000, Fawcette Technical Publications, vol. 10, No. 3, pp. 32-33, 39-40, 42, 44, 46.

(Continued)

Primary Examiner—Wen-Tai Lin

(57) ABSTRACT

A server-side control object processes and generates a client-side user interface element for display on a web page. Multiple server-side control objects may be combined into a hierarchy of server-side control objects that cooperate to generate the resulting authoring language code, such as HTML, for display of a web page on a client. The operation of processing the client-side user interface element may include at least one of an event handling operation, a postback data handling operation, a data binding operation, and a state management operation. The state management operation relates to the state of a server-side control object.

2 Claims, 9 Drawing Sheets

OTHER PUBLICATIONS

Dobson, R., "Data Binding in Dynamic HTML," DBMS MAG, 'Online! Mar. 1998 pp. 47-52.

Shapiro, M., "A Binding Protocol for Distributed Shared Objects," Proceedings of the Int'l Conference on Distributed Computing Systems, Poznan, Poland, Jun. 21-24, 1994, Los Alamitos, IEEE Comp. Soc. Press.

Esposito, Dino, "Heaven Sent," Developer Network Journal, Mar.-Apr. 2001, Matt Publishing, UK, No. 23 pp. 18-24.

European Search Report for EP 01 11 1681, Dec. 2002.

European Search Report for EP 01 11 1682, Dec. 2002.

European Search Report for EP 01 11 1680, Dec. 2002.

European Search Report for EP 01 11 1678, Dec. 2002.

Chapter 3, "Mechanics of Developing JavaScript Applications," Server-Side Javascript Guide, 'Online! 1999, pp. 52-108, www.developer.netscape.com/docs/manuals/ssjs/1_4/ssjs.pdf>.

Chapter 6, "Session Management Service," Server-Side Javascript Guide, 'Online! 1999, pp. 125-166, www.developer.netscape.com/docs/manuals/ssjs/1_4/ssjs.pdf>.

* cited by examiner

```
1   <%@ Page Language="VB" Description="Simple Sample Page" Errorpage="ErrorPage.aspx" %>
2   <html>
3     <script runat=server>
4       Sub AddButton_Click(ByVal Source as Object, By Val E as Event Args)
5         Message.Text = "Add" & UserName.Text
6       End Sub
7       Sub DeleteButton_Click(ByVal Source as Object, By Val E as Event Args)
8         Message.Text = "Delete" & UserName.Text
9       End Sub
10    </script>
11    <body>
12      <form runat="server">
13        User Name:       <input type="Text" id="UserName" runat=server>
14        <br>
15        <button id="AddButton" value="ADD" OnClick="AddButton_Click" runat=server>
16        <button id="DeleteButton" value="DELETE" OnClick="DeleteButton_Click" runat=server>
17        <br><br>
18        <span id="Message" runat=server> </span>
19      </form>
20    </body>
21  </html>
```

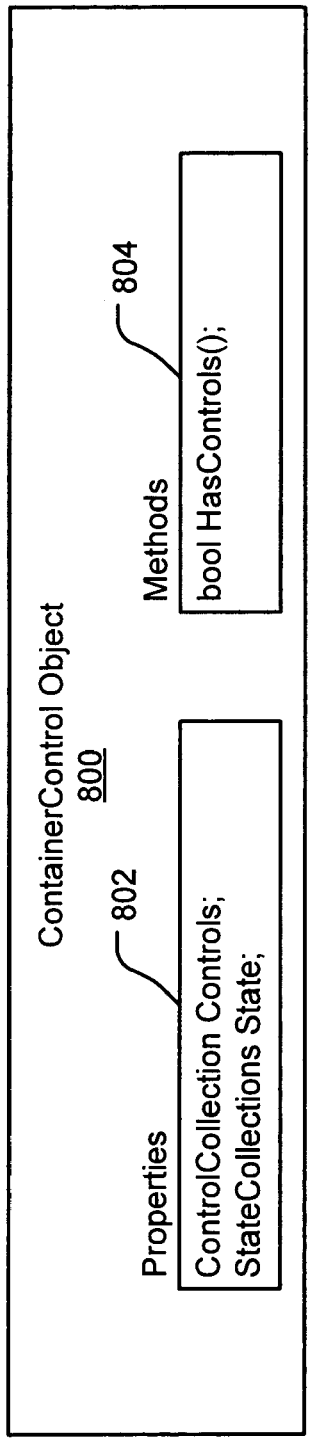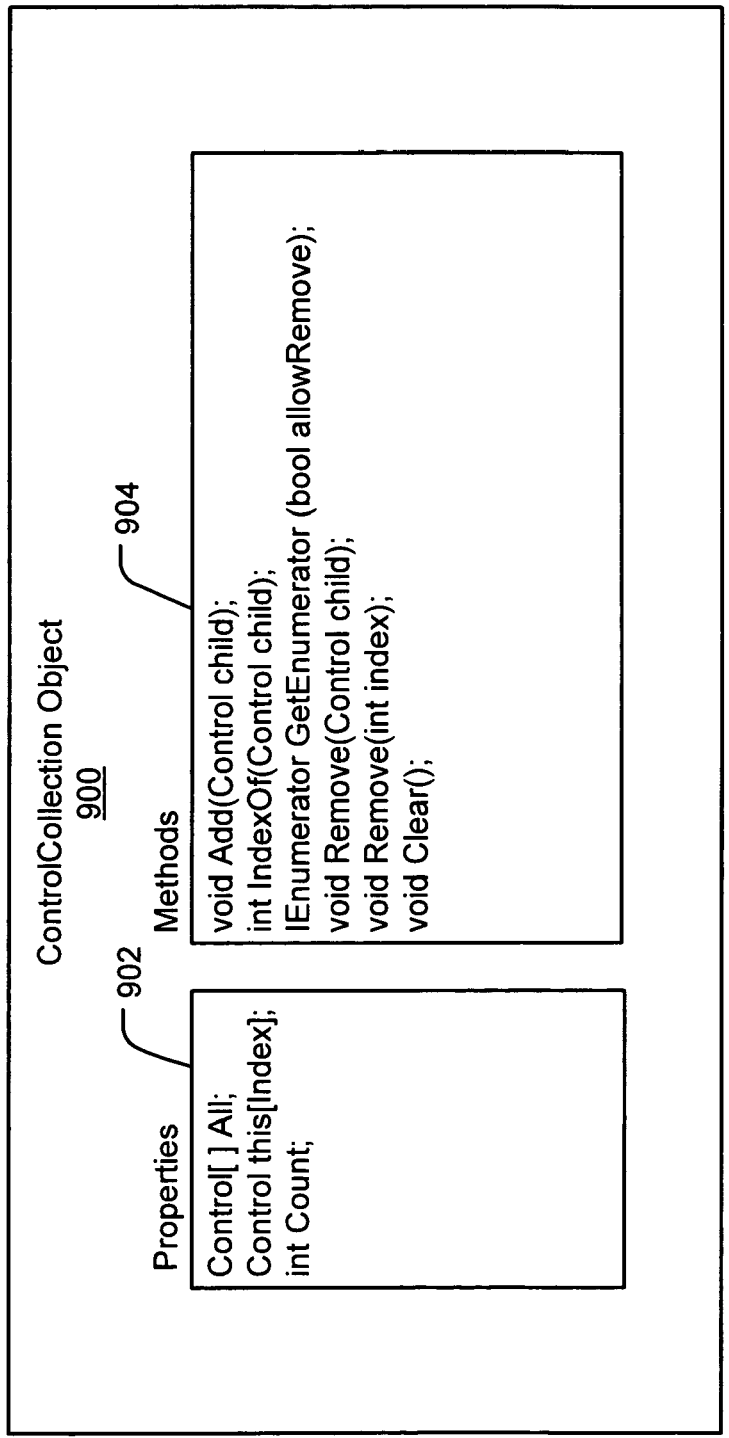

SERVER-SIDE CONTROL OBJECTS FOR PROCESSING CLIENT-SIDE USER INTERFACE ELEMENTS

RELATED APPLICATIONS

The present application is a continuation of and claims priority to U.S. patent application Ser. No. 09/573,769, entitled SERVER-SIDE CONTROL OBJECTS FOR PROCESSING CLIENT-SIDE USER INTERFACE ELEMENTS, filed by the present inventors on May 18, 2000 now U.S. Pat. No. 6,961,750 and assigned to Microsoft Corp. Said application is hereby incorporated herein by reference.

The present application is related to U.S. Pat. No. 6,797,900, entitled STATE MANAGEMENT OF SERVER-SIDE CONTROL OBJECTS (issued Jun. 29, 2004); U.S. Pat. No. 6,792,607, entitled DATABINDING USING SERVER-SIDE CONTROL OBJECTS (issued Sep. 14, 2004); U.S. Pat. No. 6,990,653, entitled SERVER-SIDE CODE GENERATION FROM A DYNAMIC WEB PAGE CONTENT FILE (issued Jan. 24, 2006); and U.S. Pat. No. 7,013,340, entitled POSTBACK INPUT HANDLING BY SERVER-SIDE CONTROL OBJECTS (issued Mar. 14, 2006), all being assigned to the Assignee of the present invention.

TECHNICAL FIELD

The invention relates generally to a web server framework, and more particularly to server-side control objects that process client-side user interface elements of a web page.

BACKGROUND OF THE INVENTION

A typical web browser receives data from a web server that defines the appearance and rudimentary behavior of a web page for display on a client system. In a typical scenario, a user specifies a Uniform Resource Locator ("URL"), a global address of a resource on the World Wide Web, to access a desired web site. Generally, the term "resource" refers to data or routines that can be accessed by a program. An example URL is "http://www.microsoft.com/ms.htm". The first part of the example URL indicates a given protocol (i.e., "http") to be used in the communication. The second part specifies the domain name (i.e., "www.microsoft.com") where the resource is located. The third part specifies the resource (i.e., a file called "ms.htm") within the domain. Accordingly, a browser generates an HTTP (HyperText Transport Protocol) request associated with the example URL to retrieve the data associated with ms.htm file within the www.microsoft.com domain. A web server hosting the www.microsoft.com site receives the HTTP request and returns the requested web page or resource in an HTTP response to the client system for display in the browser.

The "ms.htm" file of the example above includes static HTML (HyperText Markup Language) code. HTML is a plain-text authoring language used to create documents (e.g., web pages) on the World Wide Web. As such, an HTML file can be retrieved from a web server and displayed as a web page in a browser to present the rich graphical experience that users have come to expect while viewing information from the Internet. Using HTML, a developer can, for example, specify formatted text, lists, forms, tables, hypertext links, inline images and sounds, and background graphics for display in the browser. An HTML file, however, is a static file that does not inherently support dynamic generation of web page content.

In some circumstances, a web page may need to display dynamic content in a browser, such as a changing stock price or traffic information. In such situations, a server-side application program is typically developed to obtain the dynamic data and format it into HTML that is sent to the browser for display in a web page as the web page is updated.

Additionally, these same server side applications programs may be used in situations where the data is not strictly dynamic but where there are so many different values that may be displayed in a static web page that it would be impractical to create the required number of static web pages. For example, a trip planning page might display two calendars: one calendar for departure date and one calendar for return date. Rather than developing hundreds of static pages with every possible pair of calendar combinations, a server-side application program can dynamically generate the appropriate static page with the appropriate calendars displayed.

Many web pages allow the user to interact with the page displayed in the browser by selecting visual elements of the page. For example, in the above mentioned trip planning page, the calendar might allow the user to interact with it, by clicking on a day to select that date, or clicking on an icon to go forward or backward a month. In existing solutions, a browser will submit an HTTP request back to the server side application program. The HTTP request can include parameters encoded in the query string, as form post variables, or some other data format to describe client-side events or data (e.g., which control the user clicked on). For example, the parameters might include the date that the user selected in one calendar, along with the date currently displayed in the other calendar.

The communication of events and data back to the server is called a "post back" because the browser typically sends the request using an HTTP POST request. The server-side application program can process the HTTP request and generate the appropriate HTML code for web page with a newly computed calendar to reflect the user's action for transmission to the client in an HTTP response. Thereafter, the resulting document is transmitted to a client system in an HTTP response, where it is displayed in the browser as a web page that shows the updated calendars.

Developing a server-side application program can be a complex task requiring not only familiarity with normal HTML coding that is used to layout a web page, but also with the programming basics, including one or more programming languages (e.g., C++, Perl, Visual Basic, or Jscript), and the HTTP protocol, including how data is sent between the browser and the server. Web page designers, on the other hand, are frequently graphics designers and editors, who may lack programming experience. Furthermore, simplifying complex web page development can speed the development of new web content by any developer.

Generally, development of a custom server-side application program also requires tremendous effort, so much, in fact, that developers are often disinclined to attempt it. Not only must a developer understand the HTML code that must be generated to display a desired web page, but the developer must understand how user interaction and client data from the web page will result in post back operations. It is desirable, therefore, to provide a development framework that allows a developer to dynamically create and process a web page with minimal programming.

One approach to minimize the programming requirements of dynamic web page generation has been the Active Server Page (ASP) framework, provided by Microsoft Corporation. An ASP resource typically includes Visual Basic or Jscript code, for example, to process an HTTP request that specifies the ASP resource as the desired resource and, thereafter, to generate the resulting HTML code in a HTTP response to the client. Furthermore, an ASP resource may reference pre-developed or third party client-side library components (e.g., client-side ACTIVEX controls) to ease a given application programming effort. However, in the current server-side application frameworks, the programming required to dynamically manage client-side user interface elements (e.g., text boxes, list boxes, buttons, hypertext links, images, sounds, etc.) within server-side applications can still require sophisticated programming skills and considerable effort. An unanswered problem exists in properly encapsulating programming required to process user interface elements, including handling postback events, so as to allow the web page developer to focus on other aspects of the web page.

SUMMARY OF THE INVENTION

In accordance with the present invention, the above and other problems are solved by providing a server-side control object framework to manage the processing and generating of client-side user interface elements. Furthermore, a hierarchy of server-side control objects can cooperate to generate the resulting authoring language code, such as standard HTML, for display of a web page on a client. The client can be, for example, any browser that supports standard HTML or another authoring language. The operation of processing the client-side user interface element may include one or more of a postback event handling operation, a postback data handling operation, a data binding operation, or a state management operation relating to the state of a server-side control object.

A great utility of an embodiment of the present invention lies in improved encapsulation of server-side processing of client-side user interface elements (e.g., input received from user interface elements and output used to generate user interface elements) and related functionality. One or more server-side control objects may be generated to logically correspond to one or more user interface elements. For example, given a user interface element representing a month on a calendar display, a hierarchy of server-side control objects may be generated corresponding to the calendar display and its various sub-elements. In one configuration, a "month" control object can hierarchically contain multiple "week" control objects, wherein each "week" control object hierarchically contains seven "day" control objects.

In addition, in an embodiment of the present invention, the server-side control objects can cooperate to process the logically corresponding user interface elements. This advantage results, in part, from the concurrent existence of multiple server-side control objects during the processing of a client request and the generation of a response. For example, upon detecting a first postback event received from the client (e.g., a click on a "next month" button element on a calendar display), one control object can raise a second event (e.g., selection of the next month for display by the "month" control object) that is thereafter detected and processed by one or more concurrently existing control objects. This cooperation provides encapsulation of complex control interaction within the server-side control objects themselves, thereby minimizing the custom event handling required of the web page developer.

A method and computer program product that process a client-side user interface element incorporated in a web page displayed on a client are provided. A request referencing a server-side declaration datastore is received. A declaration is inputted from the server-side declaration datastore. A server-side control object is generated and programmed to provide functionality of the user interface element based on the declaration. The user interface element is processed using the server-side control object. Authoring language data is generated from the server-side control object for displaying the user interface element in the web page.

A hierarchy of server-side control objects, executable by a computer, for processing one or more client-side user interface elements incorporated in a web page displayed on a client is provided. One or more server-side child objects correspond to the one or more client-side user interface elements. Each server-side child object handles input received from the client and generates authoring language data for display of the client-side user interface element on the client. At least one hierarchical identifier is received from the client in association with the input specifying one of the server-side child objects. A server-side page object contains the server-side child objects and receives the input for distribution to one of the server-side child objects in accordance with the hierarchical identifier.

BRIEF DESCRIPTION OF THE DRAWINGS

FIG. 4 illustrates an exemplary dynamic content resource (e.g., an ASP+ resource) in an embodiment of the present invention.

FIG. 8 illustrates an exemplary server-side ContainerControl class in an embodiment of the present invention.

FIG. 9 illustrates an exemplary server-side ControlCollection class in an embodiment of the present invention.

DETAILED DESCRIPTION OF THE INVENTION

An embodiment of the present invention includes a server-side control object for processing and generating a client-side user interface element for display on a web page. Furthermore, a hierarchy of server-side control objects can cooperate to generate the resulting authoring language code, such as standard HTML, for display of a web page on a client. The client can be, for example, any browser that supports standard HTML or another authoring language. In an embodiment of the present invention, server-side control objects logically correspond to client-side user interface elements and generate at a server the authoring language code to be used by a client-side browser to display and process a web page. The operation of processing the client-side user interface element may include one or more of a postback event handling operation, a postback data handling operation, a data binding operation, and a state management operation. The state management operation relates to the state of a server-side control object.

Figure 1:
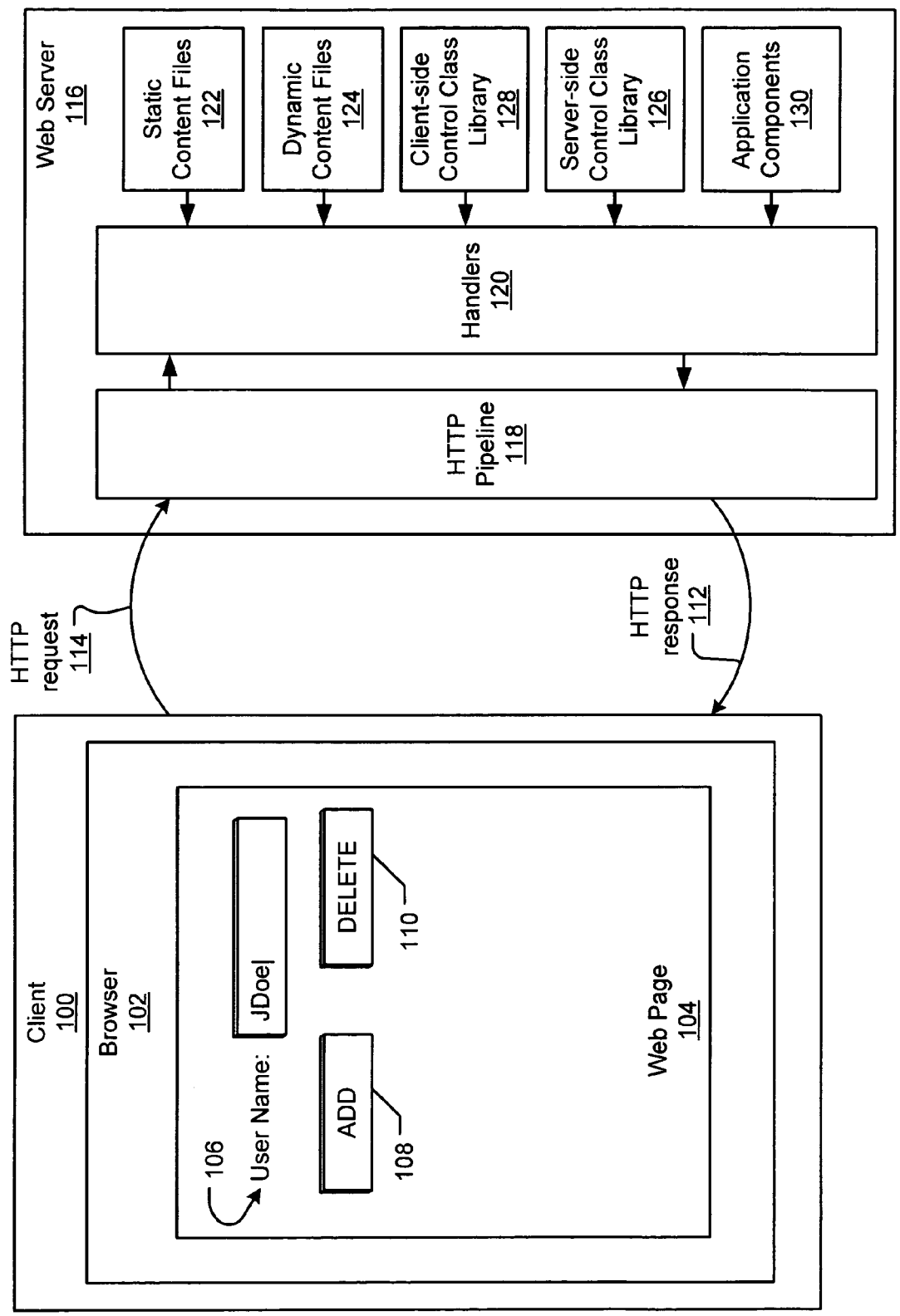
FIG. 1 illustrates a web server for dynamically generating web page content for display on a client in an embodiment of the present invention.

FIG. 1 illustrates a web server for dynamically generating web page content for display on a client in an embodiment of the present invention. A client 100 executes a browser 102 that displays a web page 104 on a display device of the client 100. The client 100 may include a client computer system having a display device, such as a video monitor. An "INTERNET EXPLORER" browser, marketed by Microsoft Corporation, is an example of a browser 102 in an embodiment of the present invention. Other exemplary browsers include without limitation "NETSCAPE NAVIGATOR" and "MOSAIC". The exemplary web page 104 incorporates a text box control 106 and two button controls 108 and 110. The browser 102 may receive HTML code in the HTTP response 112 from a web server 116 and displays the web page as described by the HTML code. Although HTML is described with reference to one embodiment, other authoring languages, including without limitation SGML (Standard Generalized Markup Language), XML (extensible Markup Language), and WML (Wireless Markup Language), which is an XML-based markup language, designed for specifying the content and user interfaces of narrowband wireless devices, such as pagers and cellular phones, are contemplated within the scope of the present invention. Furthermore, although standard HTML 3.2 is primarily disclosed herein, any version of HTML is supportable within the scope of the present invention.

The communications between the client 100 and the web server 116 may be conducted using a sequence of HTTP requests 114 and HTTP responses 112. Although HTTP is described with reference to one embodiment, other transport protocols, including without limitation S-HTTP, are contemplated within the scope of the present invention. On the web server 116, an HTTP pipeline module 118 receives an HTTP request 114, resolves the URL, and invokes an appropriate handler 120 for processing the request. In an embodiment of the present invention, a plurality of handlers 120 to handle different types of resources are provided on the web server 116.

For example, if the URL specifies a static content resource 122, such as an HTML file, a handler 120 accesses the static content resource 122 and passes the static content resource 122 back through the HTTP pipeline 118 for communication to the client 100 in an HTTP response 112. Alternatively, in an embodiment of the present invention; if the URL specifies a dynamic content resource 124, such as an ASP+ resource, a handler 120 accesses the dynamic content resource 124, processes the contents of the dynamic content resource 124, and generates the resulting HTML code for the web page 104. In an embodiment of the present invention, the resulting HTML code includes standard HTML 3.2 code. Generally, a dynamic content resource is a server-side declaration datastore (e.g., an ASP+ resource) that can be used to dynamically generate the authoring language code that describes a web page to be displayed on a client. The HTML code for the web page is then passed through the HTTP pipeline 118 for communication to the client 100 in an HTTP response 112.

During its processing, a handler 120 can also access libraries of pre-developed or third party code to simplify the development effort. One such library is a server-side class control library 126, from which the handler 120 can instantiate server-side control objects for processing user interface elements and generating the resultant HTML data for display of a web page. In an embodiment of the present invention, one or more server-side control objects map to one or more user interface elements, visible or hidden, on the web page described in the dynamic content resource 124.

A second library, in contrast, is a client-side control class library 128, such as a library including "ACTIVEX" components from Microsoft Corporation. An "ACTIVEX" control is a COM ("Component Object Model") object that follows certain standards in how it interacts with its client and other components. A client-side "ACTIVEX" control, for example, is a COM-based component that can be automatically downloaded to a client and executed by a web browser on the client. Server-side ACTIVEX components (not shown) are COM-based components that may be implemented on a server to perform a variety of server-side functions, such as providing the server-side functionality of a stock price look-up application or database component. A more detailed discussion of ACTIVEX can be found in "Understanding ACTIVEX and OLE", David Chappell, Microsoft Press, 1996.

In contrast to "ACTIVEX" controls, a server-side control object in an embodiment of the present invention, being specified in a dynamic content resource 124, logically corresponds to a user interface element that is displayed on the client. The server-side control object can also generate valid HTML code that can include, for example, an HTML tag and a locator referencing a given client-side "ACTIVEX" control. If the browser already has the code for the client-side "ACTIVEX" control within its storage system, the browser executes the "ACTIVEX" control within the web page on the client. Otherwise, the browser downloads the code for the "ACTIVEX" control from the resource specified by the locator and then executes the "ACTIVEX" control within the web page on the client. A server-side control object in an embodiment of the present invention can also raise events to a server-side "ACTIVEX" object used to implement a stock look-up application on the server.

A handler 120 also has access to one or more non-user-interface server components 130 that execute on the web server 116 or on another accessible web server. A non-user-interface server component 130, such as a stock price look-up application or database component, may be referenced in or associated with a dynamic content resource 124 that is processed by a handler 120. Server-side events raised by the control objects declared in the dynamic content resource 124 may be processed by server-side code, which calls appropriate methods in the non-user-interface server component 130. As a result, the processing provided by the server-side control objects simplifies the programming of the non-user-interface server component 130 by encapsulating the processing and generation of the user interface elements of a web page, which allows the developer of the non-user-interface server component 130 to concentrate on the specific functionality of the application, rather than on user interface issues.

Figure 2:
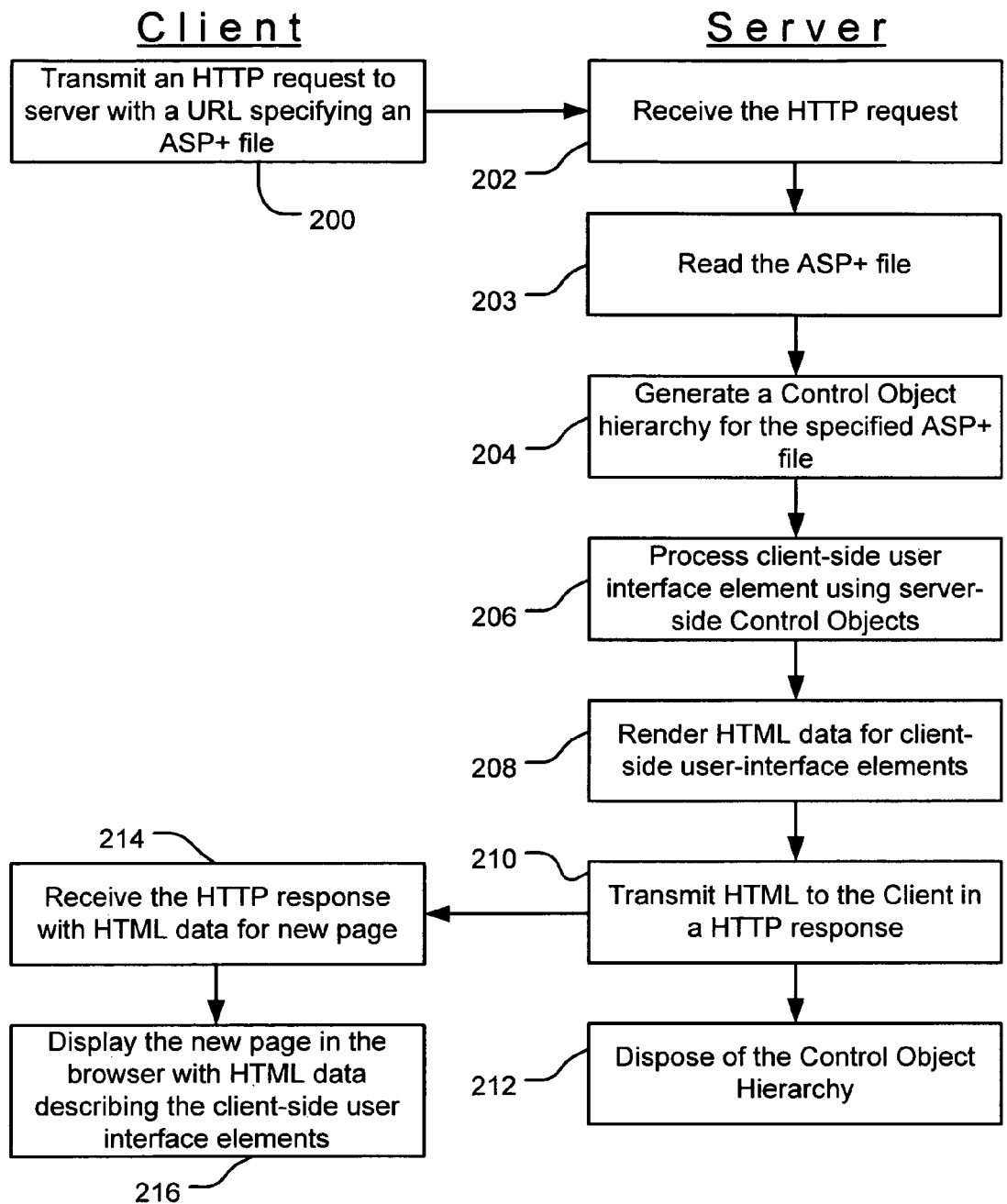
FIG. 2 illustrates a flow diagram of operations for processing and rendering client-side user interface elements using server-side control objects in an embodiment of the present invention.

FIG. 2 illustrates a flow diagram of operations for processing and generating client-side user interface elements using server-side control objects in an embodiment of the present invention. In operation 200, the client transmits an HTTP request to the server. The HTTP request includes a URL that specifies a resource, such as an ASP+ resource. In operation 202, the server receives the HTTP request and invokes the appropriate handler for processing the specified resource. The ASP+ resource is read in operation 203. Operation 204 generates a server-side control object hierarchy based on the contents of the specified dynamic content resource (e.g., the ASP+ resource).

In operation 206, the server-side control objects of the control object hierarchy perform one or more of the following operations: postback event handling, postback data handling, state management, and data binding. Postback events and data (collectively "postback input") from user interface elements are communicated from the client to the server for processing. A postback event, for example, may include without limitation a "mouse click" event from a client-side button element or a "data change" event from a client-side textbox element that is communicated to the server. Postback data, for example, may include without limitation text entered by a user in a text box element or an index of an item selected from a drop-down box. A postback operation, however, may result from other events, and not just from user interaction.

In operation 208, each server-side control object in the hierarchy is called to generate (or render) data, such as HTML code, for display of client-side user interface elements in the web page. Note that, although the term "render" may be used to describe the operation of displaying graphics on a user interface, the term "render" is also used herein to describe the operation of generating authoring language data that can be interpreted by client-application, such as a browser, for display and client-side functionality. A more detailed discussion of the processing operation 206 and the rendering operation 208 is provided in association with FIG. 6. In one embodiment, calls to render() methods in individual control objects are performed using a tree traversal sequence. That is, a call to the render() method of a page object results in recursive traversal throughout appropriate server-side control objects in the hierarchy. Alternative methods for calling the render() methods for appropriate control objects may also be employed, including an event signaling or object registration approach. The parentheses designate the "render()" label as indicating a method, as compared to a data value.

In an embodiment of the present invention, the actual creation of the individual server-side control objects may be deferred until the server-side control object is accessed (such as when handling postback input, loading a state, rendering HTML code from the control object, etc.) in operations 206 or 208. If a server-side control object is never accessed for a given request, deferred control object creation optimizes server processing by eliminating an unnecessary object creation operation. More details on deferred control object creation and postback input handling can be found in U.S. patent application Ser. No. 09/574,165, filed May 18, 2000 entitled POSTBACK INPUT HANDLING BY SERVER SIDE CONTROL OBJECTS, incorporated herein by reference for all that it discloses and teaches, filed concurrently herewith, and assigned to the Assignee of the present application.

Operation 210 transmits the HTML code to the client in an HTTP response. In operation 214, the client receives the HTML code associated with a new web page to be displayed. In operation 216, the client system incorporates (e.g., displays) the user interface elements of the new page in accordance with the HTML code received from the HTTP response. It should be understood, however, that incorporation of a user-interface element may include non-display operations, such as providing audio or tactile output, reading and writing to memory, controlling the operation of scripts, etc. In operation 212, the server-side control object hierarchy is terminated. In an embodiment of the present invention, server-side control objects in the hierarchy are created in response to an HTTP request referencing an associated ASP+ resource, and destroyed subsequent to the rendering of authoring language data (e.g., HTML data). In an alternative embodiment, operation 212 may be performed after operation 208 and before operation 210.

Figure 3:
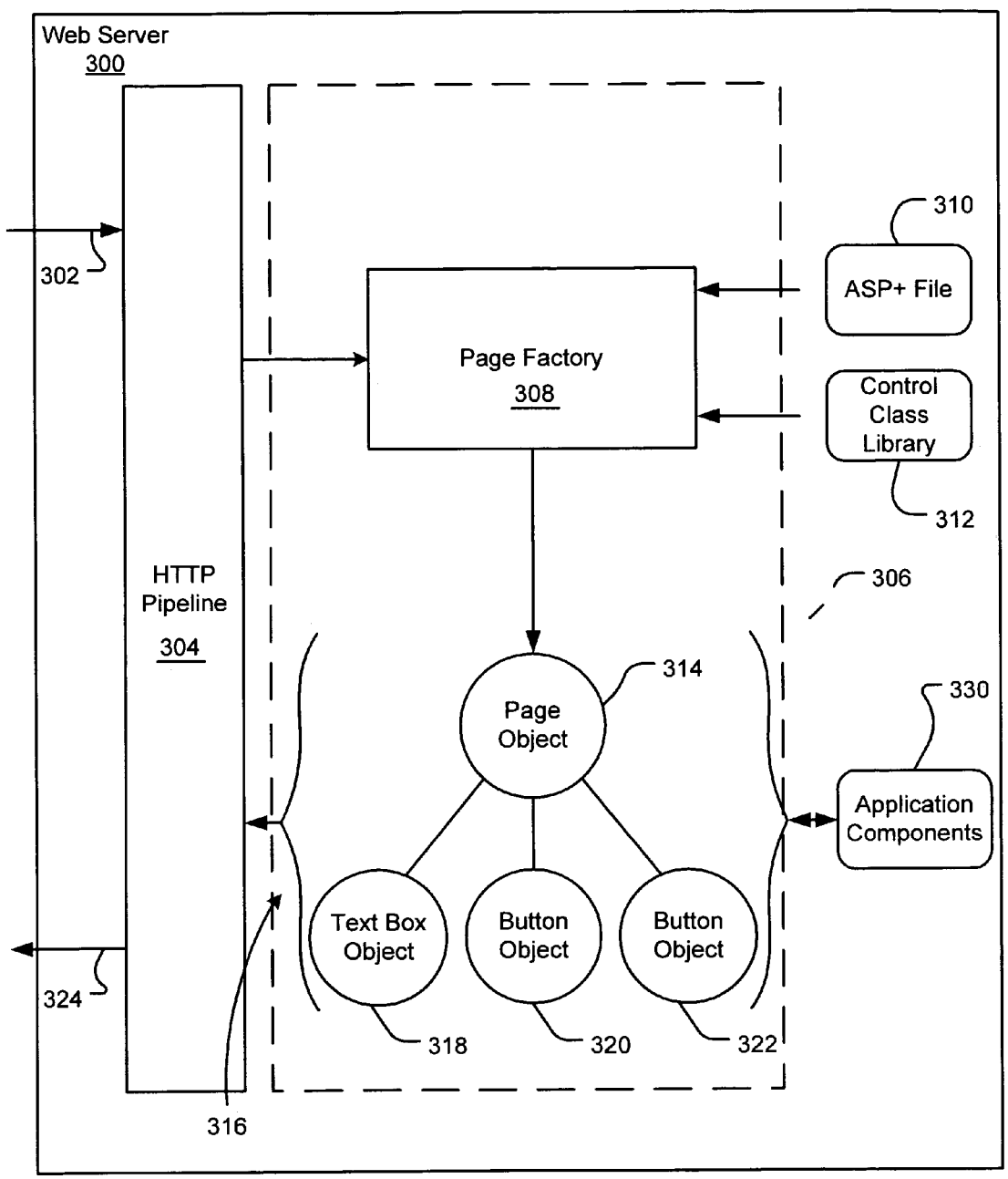
FIG. 3 illustrates exemplary modules in a web server used in an embodiment of the present invention.

FIG. 3 illustrates exemplary modules in a web server used in an embodiment of the present invention. The web server 300 receives an HTTP request 302 into the HTTP pipeline 304. The HTTP pipeline 304 may include various modules, such as modules for logging of web page statistics, user authentication, user authorization, and output caching of web pages. Each incoming HTTP request 302 received by the web server 300 is ultimately processed by a specific instance of an IHTTPHandler class (shown as handler 306). The handler 306 resolves the URL request and invokes an appropriate handler factory (e.g., a page factory module 308).

In FIG. 3, a page factory module 308 associated with the ASP+ resource 310 is invoked to handle the instantiation and configuration of the ASP+ resource 310. In one embodiment, an ASP+ resource can be identified by designating a particular suffix (or a file extension such as ".aspx") with the resource. When a request for a given ASP+ resource is first received by the page factory module 308, the page factory module 308 searches the file system for the appropriate file (e.g., the .aspx file 310). The file may contain text (e.g., authoring language data) or another data format (e.g., byte-code data or encoded data) that may later be interpreted or accessed by the server to service the request. If the physical file exists, the page factory module 308 opens the file and reads the file into memory. If the file cannot be found, the page factory module 308 returns an appropriate "file not found" error message.

After reading the ASP+ resource 310 into memory, the page factory module 308 processes the file content to build a data model of the page (e.g., lists of script blocks, directives, static text regions, hierarchical server-side control objects, server-side control properties, etc.). The data model is used to generate a source listing of a new object class, such as a COM+ ("Component Object Model+") class, that extends the page base class. The page base class includes code that defines the structure, properties, and functionality of a basic page object. In an embodiment of the present invention, the source listing is then dynamically compiled into an intermediate language and later Just-In-Time compiled into platform native instructions (e.g., X86, Alpha, etc.). An intermediate language may include general or custom-built language code, such as COM+ IL code, Java bytecodes, Modula 3 code, SmallTalk code, and Visual Basic code. In an alternative embodiment, the intermediate language operations may be omitted, so that the native instructions are generated directly from the source listing or the source file (e.g., the ASP+ resource 310). A control class library 312 may be accessed by the page factory module 308 to obtain predefined server-side control classes used in the generation of the control object hierarchy.

The page factory module 308 outputs a page object 314, which is a server-side control object that corresponds to the web page 104 of FIG. 1. The page object 314 and its children (i.e., a text box object 318, a button object 320, and another button object 322) comprise an exemplary control object hierarchy 316. Other exemplary control objects are also contemplated in accordance with the present invention, including without limitation objects corresponding to the HTML controls in Table 1, as well as custom control objects.

The page object 314 corresponds to the web page 104 of FIG. 1. The text box object 318 corresponds to the text box 106 in FIG. 1. Likewise, the button object 320 corresponds to the add button 108 in FIG. 1, and the button object 322 corresponds to the delete button 110 in FIG. 1. The page object 314 is hierarchically related to other control objects on the server. In one embodiment, a page object is a container object that hierarchically contains its children control objects. In an alternative embodiment, other forms of hierarchical relation may be employed, including a dependency relationship. In a more complex control object hierarchy with multiple levels of children, a child object can be a container object for other child objects.

In the illustrated embodiment, the control objects in the control object hierarchy 316 are created and executed on the server 300, and each server-side control object logically corresponds to a corresponding user interface element on the client. The server-side control objects also cooperate to handle postback input from the HTTP request 302, to manage the states of server-side control objects, to perform data binding with server-side databases, and to generate authoring language data (e.g., HTML code) used to display a resulting web page at the client. The resulting authoring language data is generated (i.e., rendered) from the server-side control object hierarchy 316 and transmitted to the client in an HTTP response 324. For example, resulting HTML code may embody any valid HTML construct and may reference ACTIVEX-type controls, JAVA applets, scripts, and any other web resources that yield client-side user interface elements (e.g., control buttons, text boxes, etc.) when processed by a browser.

By virtue of declarations made in the ASP+ resource 310, server-side control objects may also access one or more non-user-interface server components 330 to provide interaction between the non-user-interface server component 330 and client-side user interface elements. For example, in response to postback input, server-side control objects can raise server-side events to the non-user-interface server components registered for those events. In this manner the non-user-interface server component 330 can interact with the user through user interface elements without programming the code required to display and process these elements.

FIG. 4 illustrates contents of an exemplary dynamic content resource in an embodiment of the present invention. In the illustrated embodiment, the file 400 contains plain-text declarations in an exemplary dynamic content resource format (e.g., ASP+). Each declaration provides instructions to a page compiler that reads the file 400, creates and invokes the appropriate server-side control objects to process the client side user interface element, and ultimately combines the rendered HTML code for transmission to the client in an HTTP response. As such, a declaration describes or references functionality of a client-side user interface element, which is implemented by a server-side control object. The server-side control object then generates the HTML code used to define a new version of the web page on the client.

The first line of the file 400 includes a directive in the format:

<%@ directive {attribute=value}%> where directive may include without limitation "page", "cache", or "import". Directives are used by the page compiler when processing a dynamic content resource to determine such characteristics as buffering semantics, session state requirements, error handling schemes, scripting languages, transaction semantics, and import directions. Directives may be located anywhere within a page file. For more details about the page compiler, see U.S. patent application Ser. No. 09/573,768, filed May 18, 2000, entitled SERVER-SIDE CODE GENERATION FROM A DYNAMIC WEB PAGE CONTENT FILE, filed concurrently herewith and assigned to the Assignee of the present application.

In the second line, <html> is a standard HTML starting tag, which is passed through to the resulting HTML code as a literal (i.e., without additional processing to render the resulting HTML code). In HTML, the <html> indicates the beginning of the HTML file and is paired with the closing tag on line 21, </html>, which is also a literal.

A code declaration block is located at lines 3-10 of the file 400. Generally, server-side code declaration blocks define page object and control object member variables and methods that are executed on the server. In the format:

<script runat = "server" [language = "language"][src = "externalfile"]>
..................................
</script> where the language and src parameters are optional. In an embodiment of the present invention, code declaration blocks are defined using <script> tags that contain a "runat" attribute having a value set to "server". Optionally, a "language" attribute may be used to specify the syntax of the inner code. The default language may represent the language configuration of the overall page; however, the "language" attribute in the code declaration block allows a developer to use different languages within the same web page implementation including, for example, Jscript and PERL (Practical Extraction and Report Language). The <script> tag may also optionally specify a "src" file, which is an external file from which code is inserted into the dynamic content resource for processing by the page compiler. It should be understood that the disclosed syntax is used in one embodiment, however, alternative embodiments may employ different syntaxes within the scope of the present invention.

In FIG. 4, two subroutines are declared in Visual Basic format within the code declaration block: AddButton_Click and DeleteButton_Click. Both subroutines take two input parameters, "Source" and "E", and are executed on the server in response to an HTTP request when a client-side click event is detected on the corresponding button. In the AddButton_Click subroutine, the text in a UserName text box is concatenated on to the word "Add" and loaded into the Text data member of Message. In the DeleteButton_Click subroutine, the text in the UserName text box is concatenated on to the word "Delete" and loaded into the Text data member of Message. Although not shown in FIG. 4, member variables of server-side control objects may be declared in the code declaration block of the file 400. For example, using a Visual Basic syntax, the key word space "DIM" declares a data variable of a server-side control object.

A "code render block" (not shown) can also be included in a dynamic content resource. In an embodiment of the present invention, a code render block executes in a single "rendering" method that executes at page render time. A code render block satisfies the following format (although other formats are contemplated in alternative embodiments):
    <% InlineCode %>
where InlineCode includes self-contained code blocks or control flow blocks that execute on the server at page render time.

Inline expressions may also be used within a code render block, using the exemplary syntax:
    <%=InlineExpression %>
where the expression contained in an InlineExpression block is ultimately encompassed by a call to "Response.Write (InlineExpression)" in a page object, which writes the value resulting from InlineExpression into an appropriate place holder in the declaration. For example, InlineExpressions may be included in a code render block as follows:
    <font size="<%=x%>">Hi<%=Name%>, you are<%= Age%>!</font>
which outputs a greeting and a statement about a person's age in a font stored in the value "x". The person's name and age are defined as strings in a code declaration block (not shown). The resulting HTML code is rendered at the server for transmission to the client in the HTTP response so as to include the values of the InlineExpressions at appropriate locations:
    <font size="12">Hi Bob, you are 35!

On line 11 of file 400, <body> is a standard HTML tag for defining the beginning of the body of the HTML document. On line 20 of file 400, the closing tag, </body>, is also shown. Both the <body> and </body> are literals in an embodiment of the present invention.

Within the body section of the HTML file 400, on line 12, the starting tag, <form>, of an HTML form block is found in FIG. 4. The ending tag, </form>, of the form block is found on line 19 of the HTML file 400. An optional parameter "id" may also be included in the HTML control tag, <form>, to associate a given identifier with the form block, thereby allowing multiple form blocks to be included in a single HTML file.

On line 18 of file 400, a server-side label, identified by "Message", is declared. The "Message" label is used in the code declared at lines 5 and 8 of the file 400 to display a label on the web page.

Within a form block, three exemplary HTML control tags are shown, corresponding to the user interface elements 106, 108, and 110 of FIG. 1. The first user interface element is declared on line 13 of the file 400 corresponding to a textbox. The text literal "User Name:" declares a label positioned to the left of the textbox. The input tag with type="Text" declares a textbox server-side control object having an id equaling "UserName" as a server-side control object that renders a textbox client-side user interface element. Lines 15 and 16 of file 400 declare the client-side user interface elements shown as buttons 108 and 110 of FIG. 1, respectively. Note that the "OnServerClick" parameter specifies the appropriate sub-routine declared in the code declaration block of the file 400. As such, the server-side button control objects generated in response to the declarations in file 400 render the HTML code for the client-side buttons and an associated server-side code for implementing the button click events.

The textbox and buttons declared in file 400 are examples of HTML server control declarations. By default, all HTML tags within an ASP+ resource are treated as literal text content and are programmatically inaccessible to page developers. However, page authors can indicate that an HTML tag should be parsed and treated as an accessible server control declaration by marking it with a "runat" attribute with a value set to "server". Each server-side control object may optionally be associated with a unique "id" attribute to enable programmatic referencing of the corresponding control object. Property arguments and event bindings on server-side control objects can also be specified using declarative name/value attribute pairs on the tag element (e.g., the OnServerClick equals "MyButton_Click" pair.

In an embodiment of the present invention, a general syntax for declaring HTML control objects is as follows:

<HTMLTag id = "Optional Name" runat = server>
......................................
</HTMLTag> where the OptionalName is a unique identifier for the server-side control object. A list of currently supported HTML tags and the associated syntax and COM+ class are illustrated in TABLE 1, although other HTML tags are contemplated within the scope of the present invention.

TABLE 1

| HTML Tag Name | Example | COM+ Class |
| --- | --- | --- |
| <a> | <a id = "MyAnchor" runat = server> My Link </a> | AnchorButton |
| <img> | <img id = "MyImage" runat = server> | Image |
| <span> | <span id = "MyLabel" runat = server> </span> | Label |
| <div> | <div id= "MyDiv" runat = server>Some contents</div> | Panel |
| <form> | <form id = "MyForm" runat = server> </form> | FormControl |
| <select> | <select id = "MyList" runat = server> <option>One</option> <option >Two</option> <option>Three</option> </select> | DropDownList |
| <input type = file> | <input id = "MyFile" type = file runat = server> | FileInput |
| <input type = text> | <input id = "MyTextBox" type = text> | TextBox |
| <input type = password> | <input id = "MyPassword" type = password> | TextBox |
| <input type = reset> | <input id = "MyReset" type = reset> | Button |

TABLE 1-continued

| HTML Tag Name | Example | COM+ Class |
|---|---|---|
| <input type = radio> | <input id = "MyRadioButton" type = radio runat = server> | RadioButton |
| <input type = checkbox> | <input id = "MyCheck" type = checkbox runat = server> | CheckBox |
| <input type = hidden> | <input id = "MyHidden" type = hidden runat = server> | HiddenField |
| <input type = image> | <input type = image src = "foo.jpg" runat = server> | ImageButton |
| <input type = submit> | <input type = submit runat = server> | Button |
| <input type = button> | <input type = button runat = server> | Button |
| <button> | <button id = MyButton runat = server> | Button |
| <textarea> | <textarea id = "MyText" runat = server> This is some sample text </textarea> | TextArea |

In addition to standard HTML control tags, an embodiment of the present invention enables developers to create re-usable components that encapsulate common programmatic functionality outside of the standard HTML tag set. These custom server-side control objects are specified using declarative tags within a page file. Custom server-side control object declarations include a "runat" attribute with a value set to "server". Optionally, the unique "id" attribute may be specified to enable programmatic referencing of the custom control object. In addition, declarative name/value attribute pairs on a tag element specify property arguments and event bindings on a server-side control object. In-line template parameters may also be bound to a server-side control object by providing an appropriate "template" prefix child-element to the parent server control object. A format for a custom server-side control object declaration is:

<servercntrlclassname id="OptionalName" [propertyname="propval"] runat=server/> where servercntrlclassname is a name of an accessible server control class, OptionalName is a unique identifier of the server-side control object, and propval represents an optional property value in the control object.

Using an alternative declaration syntax, XML tag prefixes may be used to provide a more concise notation for specifying server-side control objects within a page, using the following format:

<tagprefix: classname id="OptionalName"runat=server/> where tagprefix is associated with a given control name space library and classname represents a name of a control in the associated name space library. An optional property-value is also supported.

In summary, an embodiment of the present invention includes server-side control objects that are created and executed on the server to generate HTML code that is sent to a client. The HTML code may embody any valid HTML constructs and may, for example, reference ACTIVEX-type controls, JAVA applets, scripts, and any other web resources to produce user interface buttons and other user interface elements at the client. A user at the client may interact with these user interface elements, which logically correspond to the server-side control objects, and send a request back to the server. The server-side control objects are recreated on the server to process the data, events, and other characteristics of the user interface elements so as to generate the next round of HTML code to be transmitted in a response to the client.

Figure 5:
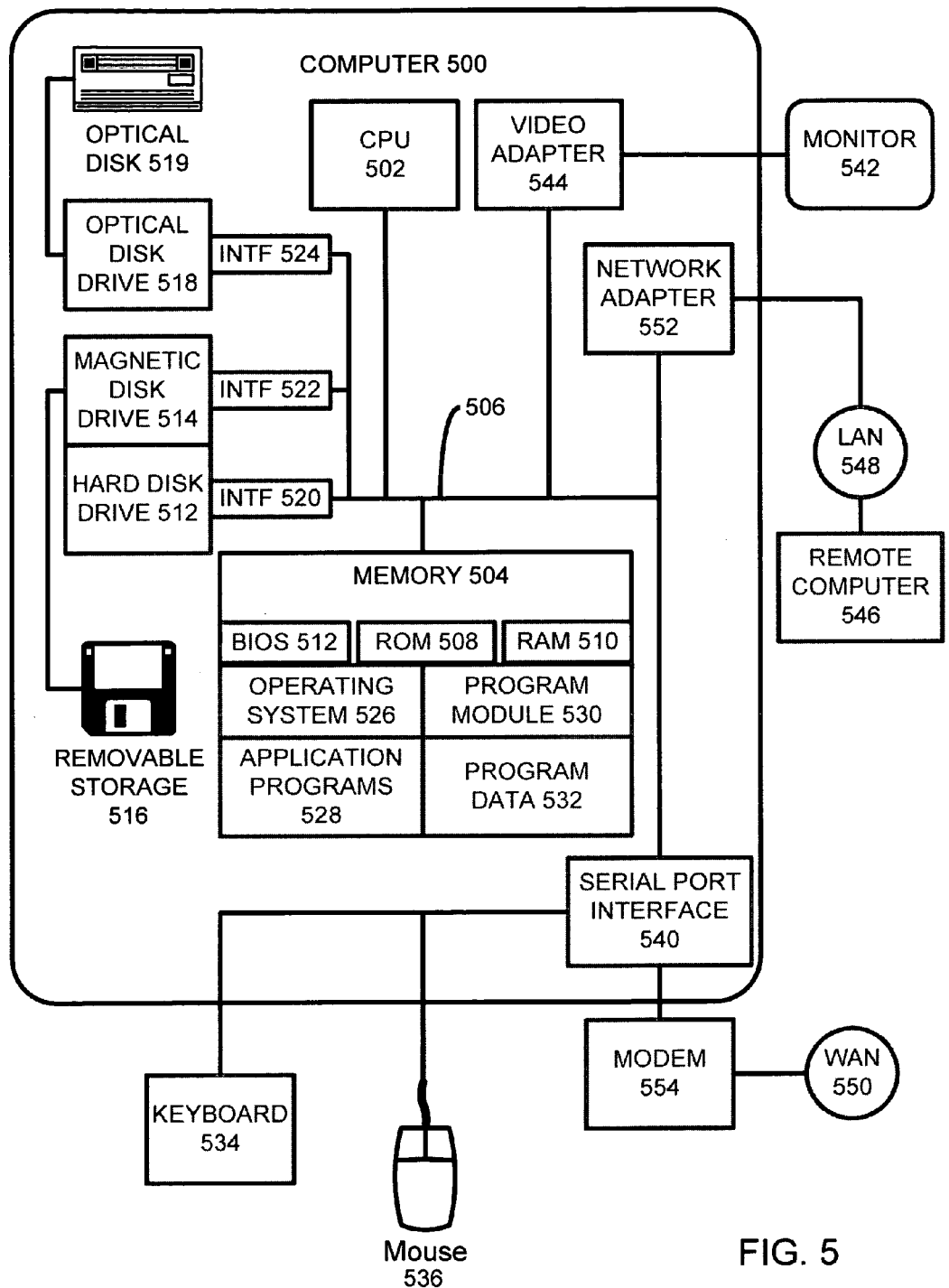
FIG. 5 illustrates an exemplary system useful for implementing an embodiment of the present invention.

With reference to FIG. 5, an exemplary computing system for embodiments of the invention includes a general purpose computing device in the form of a conventional computer system 500, including a processor unit 502, a system memory 504, and a system bus 506 that couples various system components including the system memory 504 to the processor unit 500. The system bus 506 may be any of several types of bus structures including a memory bus or memory controller, a peripheral bus and a local bus using any of a variety of bus architectures. The system memory includes read only memory (ROM) 508 and random access memory (RAM) 510. A basic input/output system 512 (BIOS), which contains basic routines that help transfer information between elements within the computer system 500, is stored in ROM 508.

The computer system 500 further includes a hard disk drive 512 for reading from and writing to a hard disk, a magnetic disk drive 514 for reading from or writing to a removable magnetic disk 516, and an optical disk drive 518 for reading from or writing to a removable optical disk 519 such as a CD ROM, DVD, or other optical media. The hard disk drive 512, magnetic disk drive 514, and optical disk drive 518 are connected to the system bus 506 by a hard disk drive interface 520, a magnetic disk drive interface 522, and an optical drive interface 524, respectively. The drives and their associated computer-readable media provide nonvolatile storage of computer readable instructions, data structures, programs, and other data for the computer system 500.

Although the exemplary environment described herein employs a hard disk, a removable magnetic disk 516, and a removable optical disk 519, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 516, optical disk 519, ROM 508 or RAM 510, including an operating system 526, one or more application programs 528, other program modules 530, and program data 532. A user may enter commands and information into the computer system 500 through input devices such as a keyboard 534 and mouse 536 or other pointing device. Examples of other input devices may include a microphone, joystick, game pad, satellite dish, and scanner. These and other input devices are often connected to the processing unit 502 through a serial port interface 540 that is coupled to the system bus 506. Nevertheless, these input devices also may be connected by other interfaces, such as a parallel port, game port, or a universal serial bus (USB). A monitor 542 or other type of display device is also connected to the system bus 506 via an interface, such as a video adapter 544. In addition to the monitor 542, computer systems typically include other peripheral output devices (not shown), such as speakers and printers.

The computer system 500 may operate in a networked environment using logical connections to one or more remote computers, such as a remote computer 546. The remote computer 546 may be a computer system, a server, a router, a network PC, a peer device or other common network node, and typically includes many or all of the elements described above relative to the computer system 500. The network connections include a local area network (LAN) 548 and a wide area network (WAN) 550. Such networking environments are commonplace in offices, enterprise-wide computer networks, intranets, and the Internet.

When used in a LAN networking environment, the computer system 500 is connected to the local network 548 through a network interface or adapter 552. When used in a WAN networking environment, the computer system 500 typically includes a modem 554 or other means for establishing communications over the wide area network 550, such as the Internet. The modem 554, which may be internal or external, is connected to the system bus 506 via the serial port interface 540. In a networked environment, program modules depicted relative to the computer system 500, or portions thereof, may be stored in the remote memory storage device. It will be appreciated that the network connections shown are exemplary, and other means of establishing a communication link between the computers may be used.

In an embodiment of the present invention, the computer 500 represents a web server, wherein the processor 502 executes a page factory module on an ASP+ resource stored on at least one of storage media 516, 512, 514, 518, 519, or memory 504. HTTP responses and requests are communicated over the LAN, 548, which is coupled to a client computer 546.

Figure 6:
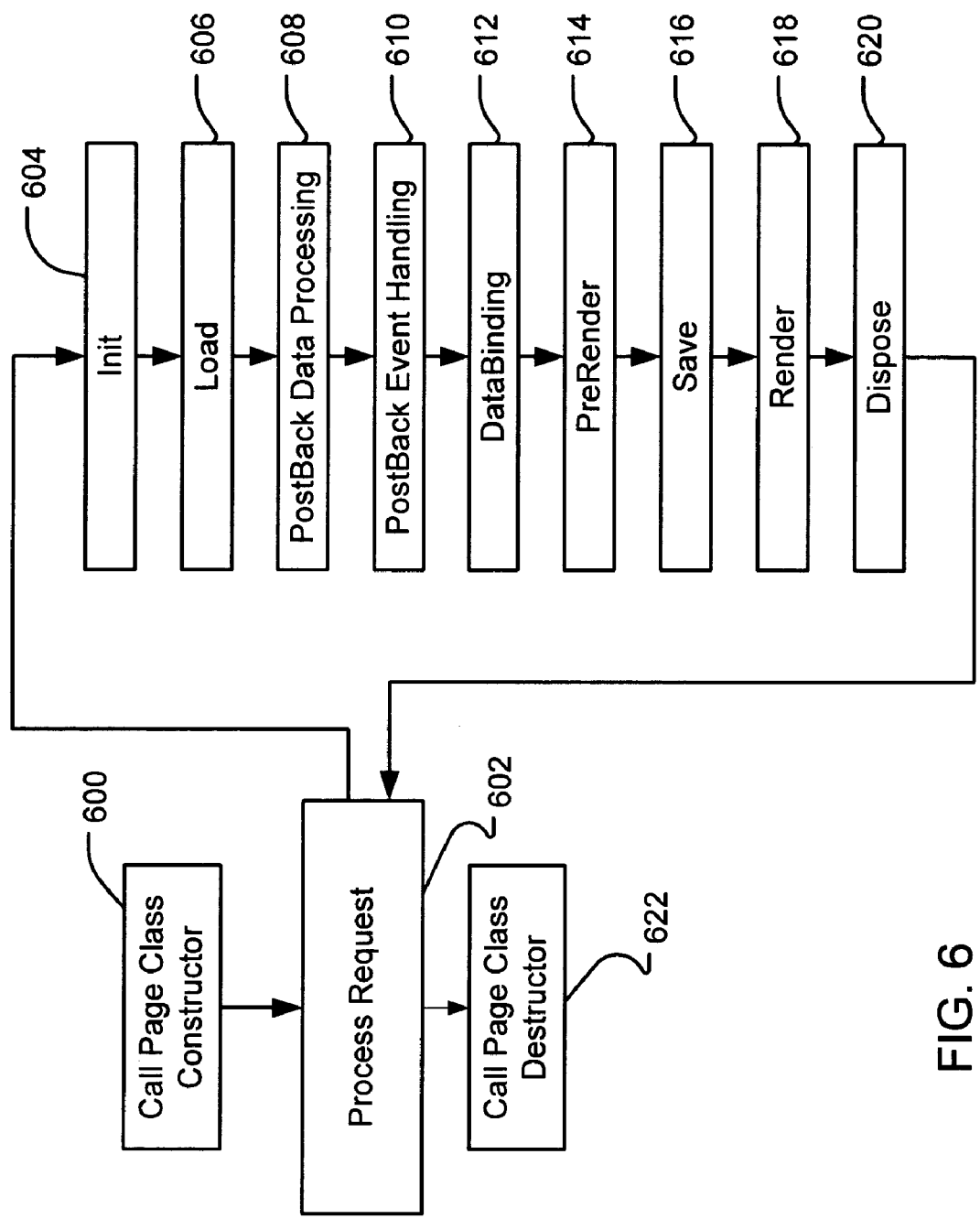
FIG. 6 illustrates a process flow diagram representing processing of a page object in an embodiment of the present invention.

FIG. 6 illustrates a process flow diagram representing server-side processing of a page object and other control objects in an embodiment of the present invention. In operation 600, a page object constructor is called by the page factory module 308 (see FIG. 3). As a result, a page object (see e.g., the page object 314 in FIG. 3) is created to logically correspond to the web page user interface element on the client. In operation 602, the page factory module calls the ProcessRequest() member function of the page object, which initiates the staged operations for processing the HTTP request received from a client. In a first stage of one embodiment of the present invention, a server-side Create operation (not shown) creates the descendant server-side control objects contained in the control object hierarchy of the page object, that is, constructors for child control objects are recursively called to create the control objects during the lifetime of the processing of the HTTP request.

In an alternate embodiment, however, creation of child control objects is deferred until the control object is required for a given processing step (e.g., handling a postback event, handling postback data, loading or saving a viewstate, resolving data binding, or rendering HTML code for the corresponding user interface element). The latter embodiment, which is said to implement "deferred control object creation", is an optimization that can alleviate unnecessary CPU and memory utilization. For example, a user input event received from the client may result in the creation of a completely different web page. In this case, it is unnecessary to instantiate an entire control object hierarchy of the previous page only to process an event that immediately results in the termination of the control object hierarchy and the instantiation of a new and different control object hierarchy for a new page.

In response to the server call to the page object's ProcessRequest method, operations 604 through 620 may be executed by the page object and by individual descendant control objects, depending in part on the data of a given HTTP request. In an embodiment of the present invention, the operation 604-620 are performed for each individual object in the order illustrated in FIG. 6; however, a given operation for one object may occur out of order or not at all with respect to a given operation of another object, depending on the HTTP request. For example, a first object may perform its Init operation 604 and its Load operation 606, and begin postback data processing operation 608, before a descendant control object performs its own Init operation 604 and Load operation 606 by virtue of deferred control object creation. The order of operation processing by the page object and descendent control objects depends on various factors, including without limitation the nature of the data in the HTTP request, the configuration of the control object hierarchy, the current state of the control objects, and whether deferred control object creation is implemented.

The Init operation 604 initializes a control object after it is created by executing any server-side code associated with initialization in the dynamic content resource. In this manner, each server-side control object may be customized with specific server-side functionality that is declared in the dynamic content resource. In an embodiment of the present invention, dynamic content code intended to customize or extend the base page control classes as declared by the page developer in the ASP+ resource on the server. When the ASP+ resource is compiled, the declared code is included in the appropriate initialization code (e.g., the Init() methods of the page object and the descendent control objects). The Init operation 604 executes this code to customize or extend the page base class and the base classes for descendent control objects.

In an embodiment of the present invention, state management of the server-side control objects is supported in a Load operation 606 and a Save operation 616, which use a transportable state structure to accommodate the stateless model for client server systems by restoring server-side control objects to their previous states. In one embodiment, the state is communicated to and from the server in one or more hidden HTML fields of an HTTP request/response pair, although other transportable state structures are contemplated within the scope of the present invention.

In a given sequence of requests and responses relating to the current page between a client and a server, the states of one or more control objects are recorded into a transportable state structure by the Save operation 616 after the processing of a previous request. In an embodiment of the present invention, additional state information is also included in the transportable state structure, including hierarchical information or control object identifiers to allow the server to associate a given state with the appropriate control object. In a subsequent HTTP request, the state information is returned to the server in the transportable state structure. The server extracts the state information from the received transportable state structure and loads the state data into the appropriate control objects within the control object hierarchy to restore each control object to its state as it existed prior to a previous HTTP response. After the current request is processed, the states of one or more server-side control objects are again recorded into the transportable state structure by the Save operation 616, and the transportable state structure is returned to the client in the next HTTP response.

As a result of the Load operation 606, each server-side control object is placed in a state consistent with its state prior to a previous HTTP response. For example, if a text box control object includes a property value equaling "JDoe" prior to a previous HTTP response, the Load operation 606 restores the same control object to its previous state, in part by loading the text string "JDoe" into the property value. In addition, whether the state of a given object is stored and restored is configurable.

In summary of one embodiment of the present invention, the state of one or more server-side control objects is "saved" after processing. The saved state information is transmitted to the client in a response. The client returns the saved state information to the server in a subsequent response. The server loads the state information a freshly instantiated server-side control object hierarchy, such that the state of the hierarchy is restored to its previous state. More details on state management can be found in U.S. Pat. No. 6,797,900, issued Jun. 29, 2004, entitled STATE MANAGEMENT OF SERVER-SIDE CONTROL OBJECTS, incorporated herein by reference for all that it discloses and teaches, filed concurrently herewith, and assigned to the Assignee of the present application.

An alternative embodiment may maintain the state information on the server or at some other web location accessible by the server during the round trip from the server to the client, and then back to the server. After the client request is received by the server, this state information may be retrieved by the server and loaded into the appropriate server-side control object(s) in the control object hierarchy.

In operation 608, postback data received from the HTTP request is processed. Postback data may be included in the payload of the HTTP request in key-value pairs, in a hierarchical representation (e.g., XML), or in other data representations, such as RDF ("Resource Description Framework"). Operation 608 parses the payload to identify a unique identifier of a server-side control object. If the identifier (e.g. "page1: text1") is found and the identified server-side control object exists in the control object hierarchy, the corresponding postback data is passed to the control object. For example, referring to FIG. 1, a unique identifier associated with textbox 106 and the text "jDoe" are communicated in the payload of the HTTP request 114 to the web server 116. Operation 608 parses the payload of the HTTP request 114 and obtains the unique identifier of the textbox 106 and its associated value (i.e., "jDoe"). Operation 608 then resolves the unique identifier of the textbox 106 to identify the corresponding server-side control object and passes the "JDoe" value to the target object for processing.

As discussed with regard to the Load operation 606, the property values of server-side control objects may be restored to their previous states. In response to the receipt of postback data, the server-side control object determines whether the passed-in postback value causes a change from the corresponding property's previous value. If so, the change is logged in a change list to indicate a data change for the associated control object. After all postback data has been processed within the control object hierarchy, a call may be made to a control object method to raise one or more postback data changed events to one or more non-user-interface server components, such as a stock price look-up application running on the server. An example of a postback data changed event is an event indicating that postback data has caused a property of a server-side control object to change. In an exemplary embodiment, such an event can be sent to a system-provided event queue so that server-side code, which may be registered to process the event, can be invoked. The server-side code may then call a method of the non-user-interface server component. In this manner, a server-side non-user-interface server component can respond to events triggered by a change in data of a server-side control object. Alternative methods of implementing events are also contemplated in the scope of the present invention, including using application-provided event queues, polling, and processing interrupts.

In operation 610, postback events are handled. Postback events may be communicated in the payload of the HTTP request. Operation 610 parses a specified event target (e.g., labeled "_LEVENTTARGET" in an embodiment of the present invention) identifying the server-side control object to which the event is directed. Furthermore, operation 610 parses the located event arguments, if any, and provides the event argument (e.g., labeled "_LEVENTARGUMENT" in an embodiment of the present invention) to the specified server-side control object. The control object raises its events for processing by server-side code, which calls a method of a non-user-interface server component (E.g., a server-side stock price look-up application) associated with the dynamic content resource. More details of postback data and postback event handling can be found in the previously incorporated U.S. Pat. No. 7,013,340, entitle POSTRACK INPUT HANDLING BY SERVER-SIDE CONTROLLED OBJECTS.

Operation 612 resolves data binding relationships between the server-side control objects and one or more databases accessible by the server, thereby updating in control object properties with database values and/or updating database fields with values of control object properties. IN an embodiment of the present invention, properties of server-side control objects may be associated (or data bound) to properties of a parent data binding container, such as a table in a server-side application database. During the data binding operation 612, the page framework may update a data bound control object property with the value of the corresponding parent data binding container property. In this manner, user interface elements on the web page of the next response accurately reflect updated property values, because the control object properties to which the user interface elements correspond have been automatically updated during the data binding operation 612. Likewise, control object properties can also be updated to the parent data binding container fields, thereby updating a server-side application database with postback input from a server-side control object. More details regarding data binding using server-side control objects can be found in U.S. Pat. No. 6,792,607, entitled DATABINDING USING SERVER-SIDE CONTROL OBJECTS, incorporated herein by reference for all that it discloses and teaches, filed concurrently herewith, and assigned to the Assignee of the present application.

Operation 614 performs miscellaneous update operations that may be executed before the control object state is saved and the output is rendered. Operation 616 requests state information (i.e., viewstate) from one or more control objects in the control object hierarchy and stores the state information for insertion into a transportable state structure that is communicated to the client in the HTTP response payload. For example, a "grid" control object may save a current index page of a list of values so that the "grid" control object may be restored to this state after a subsequent HTTP request (i.e., in operation 606). As described above, the viewstate information represents the state of the control object hierarchy prior to any subsequent actions by the client. When the viewstate information is returned, it will be used to place the control object hierarchy in that previous state prior to processing any client postback input or databinding.

The render operation 618 generates the appropriate authoring language output (e.g., HTML data) for communication to the client in an HTTP response. Rendering is accomplished through a top-down hierarchical tree walk of all server-side control objects and embedded rendering code. Operation 620 performs any final cleanup work (e.g., closing files or database connections) before the control object hierarchy is terminated. Processing then returns to operation 602 and proceeds to operation 622 where the page object is terminated by calling its destructor.

Figure 7:
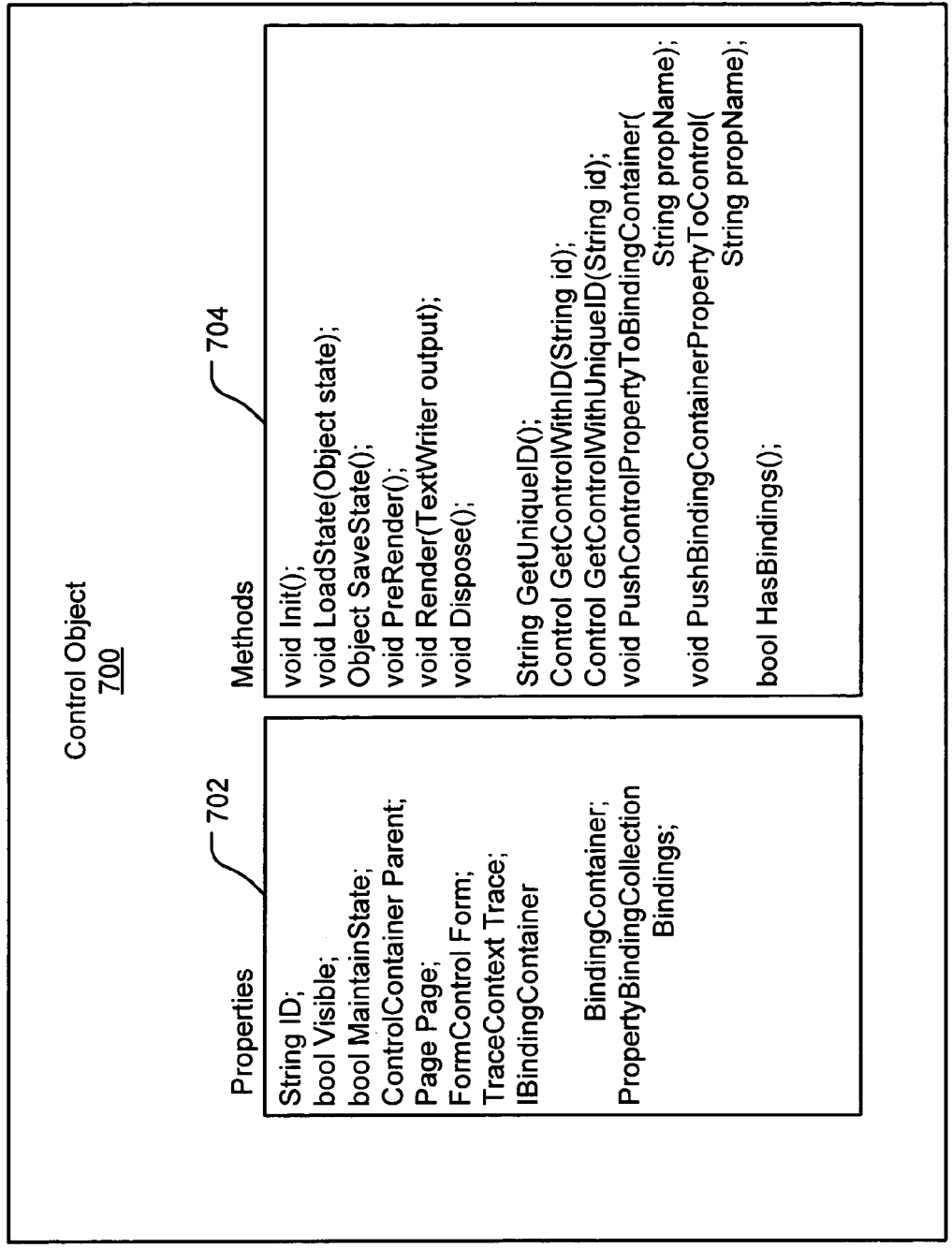
FIG. 7 illustrates an exemplary server-side Control class in an embodiment of the present invention.

FIG. 7 illustrates a representation of an exemplary server-side Control class in an embodiment of the present invention. The server-side control class defines the methods, properties and events common to all server-side control objects in an embodiment of the present invention. More specific Control classes (e.g., a server-side button control object that corresponds to a client-side button in a web page) are derived from the control class. A Control class 700 is illustrated as including memory that stores properties 702 and methods 704. Other Control class embodiments having a different combination of data members and methods are also contemplated within the scope of the present invention.

In the illustrated embodiment, properties 702 are public. Property "ID" is a readable and writable string value indicating a control object identifier. Property "Visible" is a readable and writable Boolean value that indicates whether the authoring language data for a corresponding client-side user interface element should be rendered. Property "MaintainState" is a readable and writable Boolean value that indicates whether the control object should save its viewstate (and the viewstate of its children) at the end of the current page request (i.e., in response to a save operation 616 in FIG. 6). Property "Parent" is a readable reference to a ControlContainer (see FIG. 8) associated with the current control object in the control object hierarchy. Property "Page" is a readable reference to the root page object in which the current control object is hosted. Property "Form" is a readable reference to a FormControl object in which the current control object is hosted. Property "Trace" is a readable reference that allows a developer to write a trace log. PropertyBindingContainer is a readable reference to the control object's immediate data binding container. Property "Bindings" is a readable reference to a collection of the control object's data binding associations.

Methods 704 include methods for processing requests and accessing data members of the control object. In one embodiment, the methods are referenced by pointers stored in the memory space of the control object. This referencing means is also employed in embodiments of other server-side objects, including a container control object, a control collection object, and a page object. Method "Init()" is used to initialize child control objects after they are created (see operation 604 of FIG. 6). Method "Load()" is used to restored the viewstate information from a previous HTTP request (see operation 606 of FIG. 6). Method "Save()" is used to save viewstate information for use with a later HTTP request (see operation 616 of FIG. 6). Method "PreRender ()" is used to perform any pre-rendering steps necessary prior to saving viewstate and rendering content (see operation 614 of FIG. 6). Method "Render (TextWriter output)" is used to output authoring language code for the user interface element corresponding to the current control object (see operation 618 of FIG. 6). The code is communicated through the output stream (passed to it in the "output" parameter) in order to store the code in the response to the client. Method "Dispose()" is used to perform final clean-up work before terminating the control object (see operation 620 of FIG. 6).

Method "GetUniqueID()" obtains a unique, hierarchically qualified, string identifier for the current control object. Method "GetControlWithID(String id)" returns a reference to an immediate child control object with the provided identifier ("id"). Method "GetControlWithUniqueID(String id)" returns a reference to a child control object having a unique hierarchical identifier ("id").

Method "PushControlPropertyTwoBindingContainer (String prop Name)" is used to update a binding container for two-way data binding from post-back data when the post-back data value changes within the server-side control object. Method "PushBindingContainerPropertyTwoControl(String prop Name)" is used to update a server-side control object property with a current binding container value. Method "HasBindings()" returns of Boolean value indicating whether a control object has any binding associations. These three functions are used to resolve binding relationships between properties of server-side control objects and attributes in server-side datastores (see the databinding operation 612 of FIG. 6).

FIG. 8 illustrates an exemplary server-side ContainerControl class in an embodiment of the present invention. The ContainerControl class provides an implementation that supports nested child control objects, and automatically serializes and de-serializes viewstate information into a transportable state structure. A ContainerControl class 800 includes memory that stores properties 802 and methods 804. Property "Controls" is a readable reference to a "ControlCollection" of the control objects children in the control object hierarchy. (See FIG. 9.) Property "StateCollection" is a readable reference to a dictionary of viewstate information used to maintain the state of a control object across multiple page requests. Method "HasControls()" returns a Boolean value indicating whether the control object has any child control objects.

In an alternative embodiment, the member properties and methods of the ContainerControl class 800 may be combined into the Control class 700 of FIG. 7, such that each control object is capable in and of itself to support children. If a control object of such an embodiment includes no such child objects, however, the Controls member (of type ControlCollection) would be empty (i.e., have no child objects).

FIG. 9 illustrates an exemplary server-side ControlCollection class in an embodiment of the present invention. A ControlCollection class 900 includes memory for storing properties 902 and methods 904. Property "All" is a readable and writable snapshot array of all child control objects of the current control object, ordered by an index. Property "this [index]" is a readable reference to an ordinal-indexed control object within the control collection. Property "Count" is a readable value indicating the number of child control objects in the collection.

Method "Add(Control child)" is used to add a specified control object to the current collection. Method "IndexOf (Control child)" returns the ordinal index of the specified child control object in the collection. Method "GetEnumerator(bool AllowRemove)" returns the enumerator of all child control objects within the collection. Method "Remove (Control value)" removes the specified control object from the current collection. Method "Remove(int index)" removes a specified control object from the current collection based on the provided index. Method "Clear()" removes all control objects from the current collection.

Figure 10:
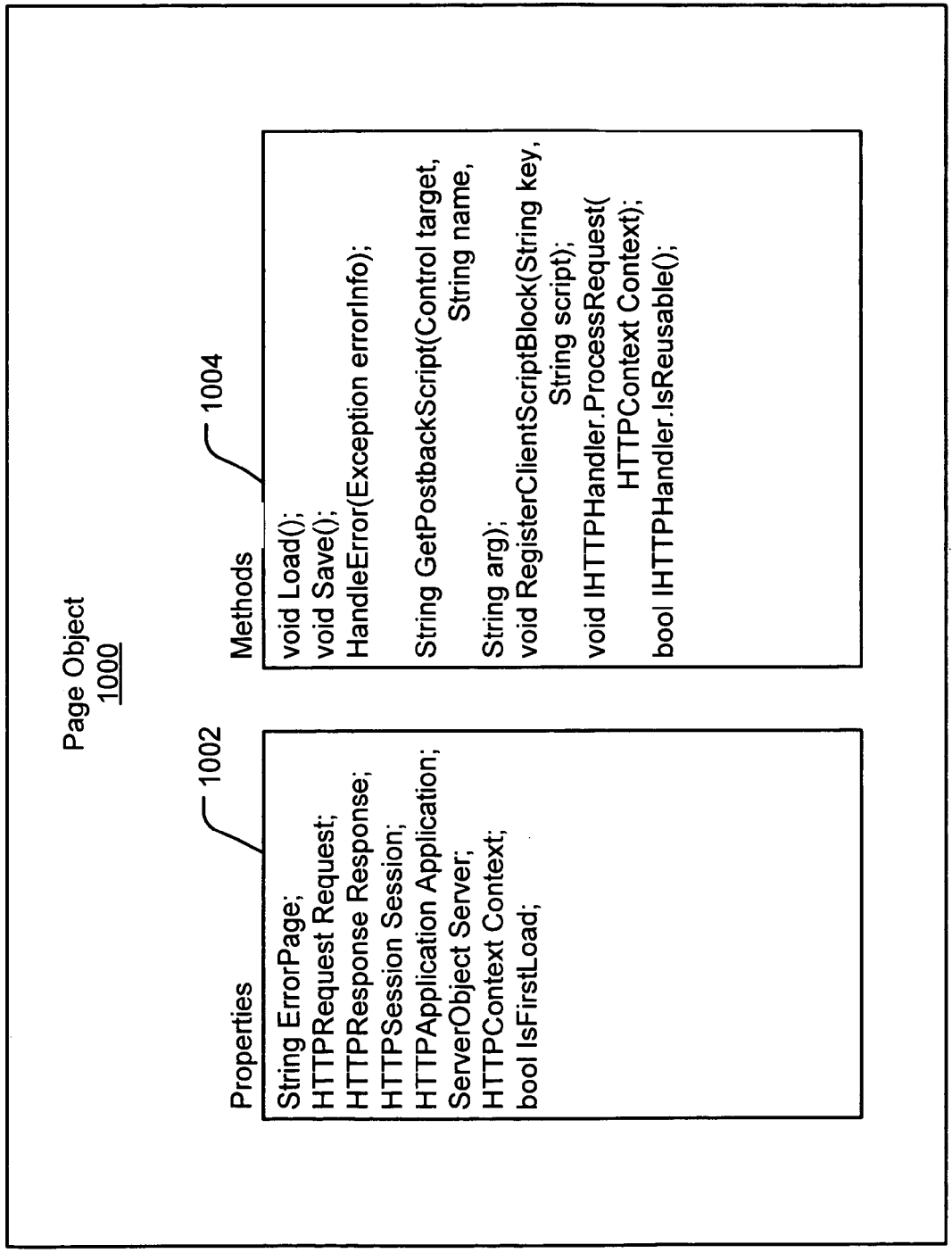
FIG. 10 illustrates an exemplary server-side Page class in an embodiment of the present invention.

FIG. 10 illustrates an exemplary server-side Page object in an embodiment of the present invention. A page base class defines the methods, properties and events common to all server-manipulated pages within an embodiment of the present invention. A page object 1000 includes memory storing properties 1002 and methods 1004. Property "ErrorPage" is a readable and writable String that is rendered in the event of an unhandled page exception. In this manner, a page object returns a readable error page to the client in an HTTP response. Property "Requests" is a readable reference to an HTTPRequest, which is provided by the web server framework that provides functionality for accessing incoming HTTP request data. Property "Response" is a readable reference to an HTTP response, provided by the web server framework, which provides functionality for transmitting HTTP response data to a client. Property "Application" is a readable reference to an HTTPApplication, provided by the web server framework. Property "Session" is a readable reference to an HTTPSession, provided by the web server framework. Property "Server" is a readable reference to a ServerObject, which is an application server page-compatible utility object. Property "Context" is a readable reference to all of the web server objects provided by the web server framework, which allows a developer to gain access to additional pipeline-module exposed objects. Property "IsFirstLoad" is a readable Boolean value that indicates whether the page object is being loaded and accessed for the first time or in response to a client postback request.

Method "Load()" is used to initialize the page object and restore viewstate information from the previous page request. Method "Save()" is used to save viewstate information for use with a later page request. Method "HandleError(Exception errorInfo)" is used to handle an unhandled error occurring during a page execution. In this event, the base class implementation redirects the client to a URL having a default error web page. Method "GetPostbackScript(Control target, String name, String arg)" returns a client-side script method associated with a given control object. Method "RegisterClientScriptBlock(String key, String script)" is used to eliminate duplicate blocks of client-side script code being sent to the client. Duplicate blocks are scripts with the same key value. Method "IHTTPHandler.ProcessRequest(HTTPContext Context)" is used to process web requests. The IHTTPHandler.ProcessRequest is called to initiate the processing of an HTTP request received from a client (see operation 602 of FIG. 6). Method "IHTTPHandler.IsReusable()" indicates whether a page object can be reused to service multiple web requests.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method for processing one or more client-side user interface elements incorporated in a web page displayed on a client, the method comprising:
   receiving first viewstate data from the client;
   inputting one or more declarations from a server-side declaration datastore:
   using the viewstate data to generate a hierarchy of server-side control objects programmed based on the declarations to provide functionality of the client-side user interface elements, the hierarchy of server-side control objects being representative of a previous configuration;
   processing the client-side user interface elements using the hierarchy of server-side control objects; and
   generating authoring language data from the hierarchy of server-side control objects for incorporating the client-side user interface elements in the web page; and
   transmitting a configuration of the hierarchy of server-side control objects to the client as viewstate data.

2. One or more computer-readable media including executable instructions that, when executed, implement a computer process that processes one or more client-side user interface elements incorporated in a web page on a client, the computer process comprising:
   receiving first viewstate data from the client;
   inputting one or more declarations from a server-side declaration datastore;
   using the viewstate data to generate a hierarchy of server-side control objects programmed based on the declarations to provide functionality of the client-side user interface elements, the hierarchy of server-side control objects being representative of a previous configuration;
   processing the client-side user interface elements using the hierarchy of server-side control objects; and
   generating authoring language data from the hierarchy of server-side control objects for incorporating the client-side user interface elements in the web page; and
   transmitting a configuration of the hierarchy of server-side control objects to the client as viewstate data.

* * * * *

UNITED STATES PATENT AND TRADEMARK OFFICE
CERTIFICATE OF CORRECTION

| | | |
|---|---|---|
| PATENT NO. | : 7,321,918 B2 | Page 1 of 1 |
| APPLICATION NO. | : 10/966618 | |
| DATED | : January 22, 2008 | |
| INVENTOR(S) | : Gary S. Burd et al. | |

It is certified that error appears in the above-identified patent and that said Letters Patent is hereby corrected as shown below:

In column 18, line 20, delete "_LEVENTTARGET" and insert -- _EVENTTARGET --, therefor.

In column 18, line 24, delete "_LEVENTARGUMENT" and insert -- _EVENTARGUMENT --, therefor.

In column 18, line 32, delete "entitle POSTRACK" and insert -- entitled POSTBACK --, therefor.

In column 18, line 40, delete "IN" and insert -- In --, therefor.

In column 22, line 22, in Claim 1, delete "datastore:" and insert -- datastore; -- , therefor.

In column 22, line 24, in Claim 1, delete "obiects" and insert -- objects --, therefor.

In column 22, line 30, in Claim 1, delete "obiects" and insert -- objects --, therefor.

In column 22, line 35, in Claim 1, delete "obiects" and insert -- objects --, therefor.

Signed and Sealed this
Twenty-second Day of February, 2011

David J. Kappos
*Director of the United States Patent and Trademark Office*